(12) United States Patent
Kameyama (10) Patent No.: US 7,408,742 B2
(45) Date of Patent: Aug. 5, 2008

(54) MAGNETIC HEAD SLIDER AND METHOD OF FABRICATING MAGNETIC HEAD SLIDER

(75) Inventor: Masaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/259,002

(22) Filed: Oct. 26, 2005

(65) Prior Publication Data

US 2006/0034016 A1  Feb. 16, 2006

Related U.S. Application Data

(63) Continuation of application No. PCT/JP03/08500, filed on Jul. 3, 2003.

(51) Int. Cl.
*G11B 5/60* (2006.01)

(52) U.S. Cl. .................................. 360/235.8

(58) Field of Classification Search ............. 360/235.8, 360/235.6, 235.7, 236.6, 236.4, 236.5, 236.3, 360/235.5, 234.3
See application file for complete search history.

(56) References Cited

U.S. PATENT DOCUMENTS

| | | | |
|---|---|---|---|
| 6,243,233 B1 | 6/2001 | Yamamoto et al. | |
| 6,246,538 B1 * | 6/2001 | Kasamatsu et al. | 360/97.01 |
| 6,683,755 B2 * | 1/2004 | Koishi | 360/235.6 |
| 6,728,069 B2 * | 4/2004 | Otsuka et al. | 360/235.8 |
| 6,785,093 B2 * | 8/2004 | Baba et al. | 360/235.8 |
| 6,920,015 B2 * | 7/2005 | Mundt et al. | 360/235.8 |
| 7,196,873 B2 * | 3/2007 | Sakairi et al. | 360/235.8 |
| 2001/0019467 A1 | 9/2001 | Otsuka et al. | |
| 2001/0022707 A1 | 9/2001 | Koishi et al. | |
| 2004/0075947 A1 * | 4/2004 | Ohwe | 360/236.2 |
| 2004/0156145 A1 * | 8/2004 | Koishi | 360/235.8 |
| 2004/0201924 A1 * | 10/2004 | Ueda et al. | 360/235.8 |
| 2005/0068688 A1 * | 3/2005 | Sbiaa et al. | 360/324.1 |
| 2005/0275970 A1 * | 12/2005 | Sakairi et al. | 360/235.8 |
| 2006/0007597 A1 * | 1/2006 | Kameyama | 360/235.8 |
| 2007/0063237 A1 * | 3/2007 | Huai et al. | 257/295 |

FOREIGN PATENT DOCUMENTS

| | | |
|---|---|---|
| JP | 08-69674 | 3/1996 |
| JP | 10-302238 | 11/1998 |
| JP | 2000-173217 | 6/2000 |
| JP | 2001-210038 | 8/2001 |

* cited by examiner

*Primary Examiner*—Allen T Cao
(74) *Attorney, Agent, or Firm*—Greer, Burns & Crain, Ltd.

(57) ABSTRACT

A magnetic head slider includes a floating surface that is opposed to a disk during the use of the magnetic head slider and that has a front part and a rear part with respect to the direction of rotation of the disk, and an electromagnetic transducer element. A front rail extending in the transverse direction and a pair of rear rails are laid on the floating surface. A plurality of first projections is formed on the front side and the rear side of the front rail. A plurality of second projections is formed behind the plurality of first projections. When the disk is stopped, the plurality of first projections is stationed on the disk but the floating surface is not in contact with the disk. The height of each of the plurality of second projections is smaller than the height of each of the plurality of first projections. When the magnetic head slider is employed in a contact start/stop (CSS) type disk drive, the plurality of second projections prevents the rear end of the floating surface from coming into contact with the disk.

14 Claims, 8 Drawing Sheets

MAGNETIC HEAD SLIDER AND METHOD OF FABRICATING MAGNETIC HEAD SLIDER

CROSS-REFERENCE TO RELATED APPLICATION

This is a Continuation of Application No. PCT/JP03/08500 filed on Jul. 3, 2003. The entire disclosure of the prior application is hereby incorporated by reference herein in its entirety.

BACKGROUND OF THE INVENTION

1. Field of the Invention

The present invention relates to a magnetic head slider, and a method of fabricating a magnetic head slider.

2. Description of the Related Art

Magnetic disk drives include a disk and a magnetic head slider supported by a suspension. The magnetic head slider has a floating surface (or flying surface) that is arranged opposed to the disk during the use of the magnetic head slider, and an electromagnetic transducer element that writes information in the disk or reads information from the disk. The floating surface has a plurality of rails. Airflow acting on the rails causes the magnetic head slider to float above the disk. The magnetic head slider is made mainly of Altic, and the portion of the magnetic head slider including the electromagnetic transducer element is made of alumina.

Japanese Unexamined Patent Publication (Kokai) No. 2000-173217 discloses a negative-pressure type magnetic head slider. The negative-pressure type magnetic head slider includes a front rail that extends in the transverse direction relative to the longitudinal direction of the magnetic head slider, and a pair of rear rails that are disposed with a given space retained behind the front rail. Airflow induced by the rotating disk generates buoyancy (or lift) at the front rail and rear rails. A step that is lower than the front rail is formed on the front side and the rear side of the front rail. Airflow flowing into an area located behind the step of the front rail after passing through the front rail generates a negative pressure on the rear side of the front rail. The magnetic head slider floats (or flies) at a relatively short distance from the disk, owing to the combination of the buoyancy and negative pressure. When the magnetic disk drive operates to make a steady-state rotation, the magnetic head slider floats while tilting in such a manner that the front part thereof floats more greatly than the rear part thereof.

Moreover, the floating surface of the magnetic head slider has a plurality of projections. The plurality of projections jut out more than the front rail and rear rails, and each of the projections has the same height. When the disk is stopped, the projections are in contact with the disk. This prevents the front rail and rear rails from coming into direct contact with the disk and being adhered to the disk. As the front rail and rear rails are not in direct contact with the disk, when the disk is rotated, airflow moves along the front rail and rear rails. This causes the magnetic head slider to float above the disk.

Moreover, a lubricant is applied to the disk. When a part of the floating surface of the magnetic head slider comes into contact with the disk or excessively approaches the disk, the lubricant sticks to the floating surface. This causes the magnetic head slider to be out of balance or adversely affects the electromagnetic transducer element.

Recently, the distance between the electromagnetic transducer element and the disk has become less along with an increasing demand for high-density recording to be achieved by the magnetic disk drive. A part of the magnetic head slider is therefore likely to come into contact with the disk. The magnetic head slider floats while tilting in such a manner that the front part thereof floats more greatly than the rear part thereof. The distance of the rear end of the floating surface from the disk is the shortest among all the parts of the floating surface. Therefore, the magnetic head slider is controlled so that the distance between the rear end of the floating surface and the disk can be retained at a predetermined value (typically called a minimum value).

The electromagnetic transducer element is located slightly ahead of the rear end of the floating surface. When the magnetic head slider tilts, the distance between the position on the floating surface at which the electromagnetic transducer element is located and the disk assumes a value a little larger than the minimum value. When the inclination (angle of pitch) of the magnetic head slider gets smaller, the difference between the distance of the position on the floating surface, in which the electromagnetic transducer element is located, from the disk, and the distance of the rear end of the floating surface from the disk also gets smaller. This situation is preferable because the electromagnetic transducer element can approach the disk. However, according to the prior art, each of the plurality of projections, intended to prevent the front rail and rear rails from being adhered to the disk, has the same height. Therefore, a layout of the magnetic head slider is restricted by some projections positioned at the rear side, and it is difficult to decrease the inclination (angle of pitch) of the magnetic head slider.

SUMMARY OF THE INVENTION

An object of the present invention is to provide a magnetic head slider, and a method of fabricating the magnetic head slider, which make it possible to reduce the distance of an electromagnetic transducer element from a disk.

A magnetic head slider in accordance with the present invention includes a floating surface, that is arranged opposed to a disk during the use of a magnetic head slider and that has a front part and a rear part with respect to the direction of rotation of the disk; an electromagnetic transducer element; a front rail laid on the floating surface; a pair of rear rails laid on the floating surface with a given space retained behind the front rail; a plurality of first projections disposed on the front side and the rear side of the front rail; and a plurality of second projections disposed behind the plurality of first projections. The height of each of the plurality of second projections is smaller than the height of each of the plurality of first projections.

Owing to the foregoing constituent features, the angle of pitch, at which the magnetic head slider floats when a magnetic disk drive makes a steady-state rotation, can be minimized. Further, the difference between the distance of the position on the floating surface, in which the electromagnetic transducer element is located, from the disk, and a minimum value, can be reduced. Herein, when the height of each of the plurality of first projections is made as small as the height of each of the plurality of second projections, a lubricant applied to the disk is likely to stick to the front rail. This causes the disadvantage in that the magnetic disk slider fails to start when employed in a magnetic disk drive of contact start/stop (CSS) type. As only the height of each of the plurality of second projections is decreased, the amount in which the electromagnetic transducer element floats can be reduced without impairment of a frictional characteristic.

Moreover, a method of fabricating a magnetic head slider in accordance with the present invention is a method of fabricating the magnetic head slider which includes a floating surface, that is arranged opposed to a disk during the use of a magnetic head slider and that has a front part and a rear part with respect to the direction of rotation of the disk; an electromagnetic transducer element; a front rail laid on the floating surface; rear rails laid on the floating surface away from the front rail; a plurality of first projections disposed on the front side and the rear side of the front rail; and a plurality of second projections disposed behind the plurality of first projections, and in which the height of each of the plurality of second projections is smaller than the height of each of the plurality of first projections. Further, in the above method, a magnetic head slider in which the height of each of a plurality of first projections is equal to the height of each of a plurality of second projections is prepared, and the plurality of second projections included in the magnetic head slider is ground or machined so that the height of each of the plurality of second projections becomes smaller than the height of each of the plurality of first projections.

DESCRIPTION OF THE PREFERRED EMBODIMENTS

Referring to the drawings, a plurality of preferred embodiments of the present invention will be described below.

Figure 1:
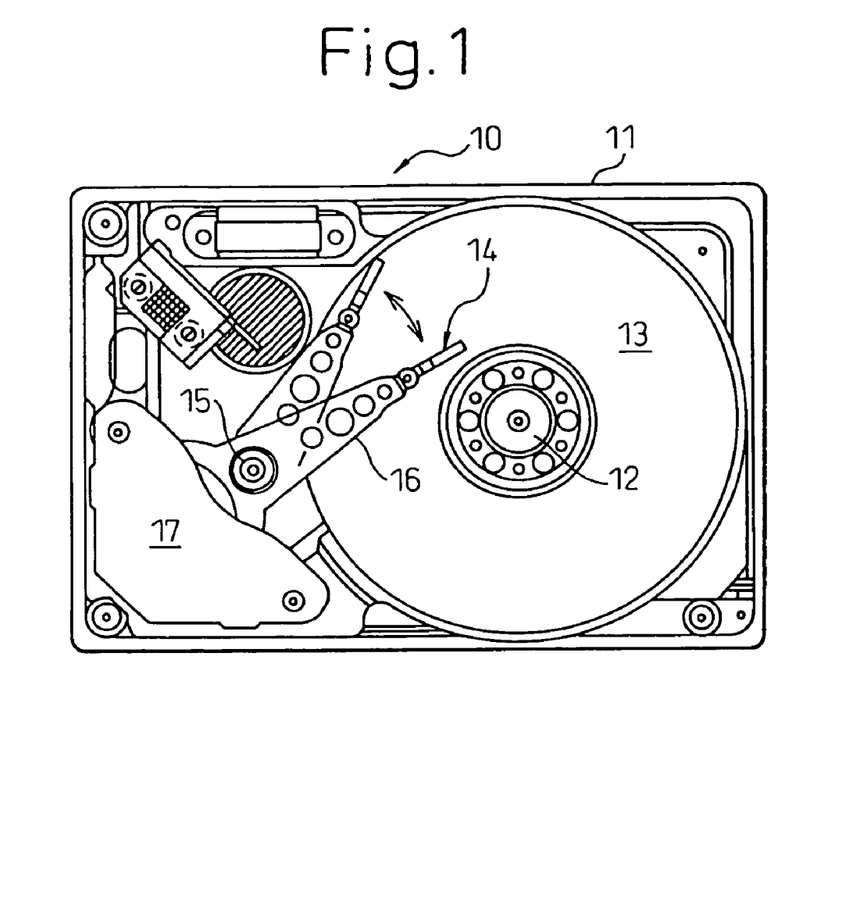
FIG. 1 is a plan view showing a magnetic disk drive to which an embodiment of the present invention is applied.

FIG. 1 is a plan view showing a magnetic disk drive to which an embodiment of the present invention is applied. In FIG. 1, a magnetic disk drive (HDD) 10 has a housing 11 in which a magnetic disk 13 engaged with a spindle motor 12 and a magnetic head slider 14 opposed to the magnetic disk 13 are arranged. The magnetic head slider 14 is fixed to the distal end of a carriage arm 16 capable of pivoting on a shaft 15. The carriage arm 16 is driven to pivot by an actuator 17, and the magnetic head slider 14 is aligned with a desired recording track of the magnetic disk 13. Consequently, the magnetic head slider 14 can write information in the magnetic disk 13 or read information from the magnetic disk 13.

Figure 2:
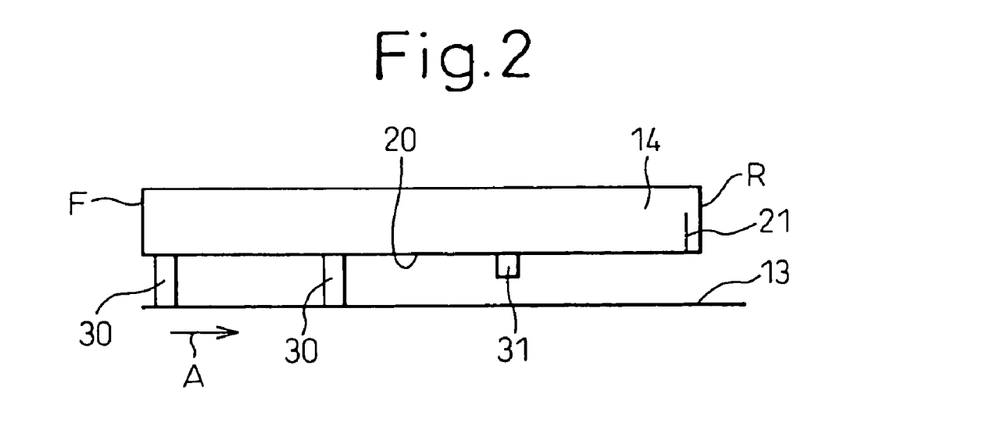
FIG. 2 is a schematic side view showing a magnetic head slider in accordance with the embodiment of the present invention located on a disk.
Figure 3:
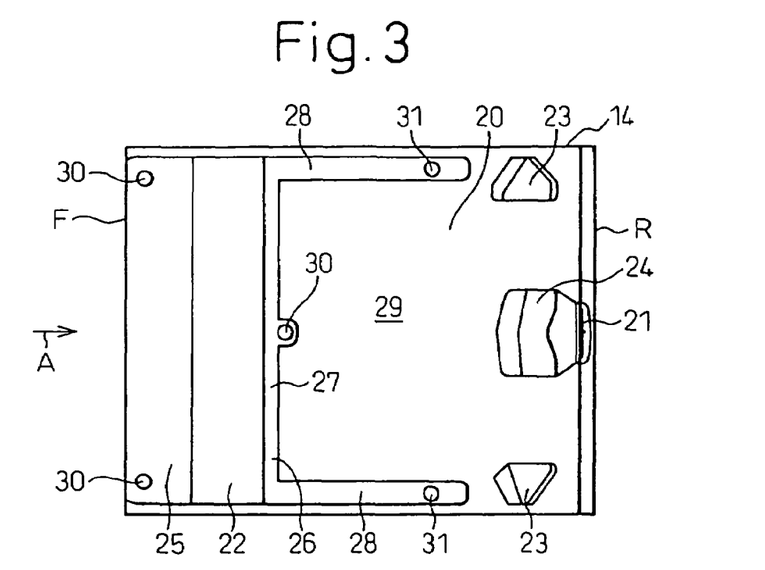
FIG. 3 is a plan view showing the magnetic head slider shown in FIG. 2.

FIG. 2 is a schematic side view showing the magnetic head slider in accordance with the embodiment of the present invention located on the disk. FIG. 3 is a plan view showing the magnetic head slider shown in FIG. 2. FIG. 3 shows the lower side of the magnetic head slider shown in FIG. 2. Referring to FIG. 2 and FIG. 3, the magnetic head slider 14 includes a floating surface 20, that is arranged opposed to the disk 13 during the use of the magnetic head slider and that has a front part F and a rear part R with respect to the direction of rotation of the disk 13, and also includes an electromagnetic transducer element 21. Herein, the floating surface 20 refers to the entire surface of the magnetic head slider 14 opposed to the disk 13. Arrow A indicates the direction of rotation of the disk 13 and the direction of airflow induced by the rotating disk 13.

The magnetic head slider 14 includes a front rail 22 laid on the floating surface 20, and a pair of rear rails 23 laid on the floating surface 20 with a given space retained behind the front rail 22. The front rail 22 extends in the transverse direction relative to the longitudinal direction of the magnetic head slider 14. The rear rails 23 are disposed on both edges of the magnetic head slider 14 near the rear part of the magnetic head slider 14. A center rail 24 is disposed in the center of the rear part of the magnetic head slider 14. The electromagnetic transducer element 21 is mounted on the center rail 24.

Steps 25 and 26 that lie lower than the front rail 22 are formed on the front and rear sides of the front rail 22. The front-side step 25 is formed the whole area on the front side of the front rail 22 on the floating surface 20. The rear-side step 26 includes a portion 27 that extends parallel to the front rail 22 and a pair of portions 28 which are connected to the portion 27 that extends parallel to the front rail 22 and which extend apart from each other, perpendicularly to the front rail 22 with a predetermined space between the pair of portions 28. The portion 27 extending parallel to the front rail 22 may be excluded but should be included in order to accurately form the front rail 22. The portions 28 extending perpendicularly to the front rail 22 with the predetermined space between then are oriented to the rear rails 23 along both edges of the magnetic head slider 14, and terminated with a predetermined space retained between each of the portions 28 and each of the rear rails 23.

The surface of the front rail 22 is flush with the surfaces of the rear rails 23. The surface of each of the steps 25 and 26 are flush with each other and slightly lower than the surface of the front rail 22 and the surfaces of rear rails 23, respectively. The surface of an area 29 surrounded with the three portions 27 and 28 of the step 26 on the rear side of the front rail 22 are much lower than the surface of the step 26 (see FIG. 10). During the use of the magnetic head slider, airflow induced by the rotating disk 13 generates buoyancy at the front rail 22 and the rear rails 23. The airflow having reached the front rail 22 passes over the front rail 22 and the portion 27 of the step 26, and then flow into the area 29. An abrupt increase in the volume of air brings about a negative pressure on the rear side of the front rail 22. The magnetic head slider 14 is called a negative-pressure type magnetic head slider 14, and floats at a relatively short distance from the disk 13, owing to the combination of the buoyancy and negative pressure.

A plurality of first projections 30 is formed in front of and behind the front rail 22 so that the first projections can surround the front rail 22. A plurality of second projections 31 is formed behind the plurality of first projections 30. The plurality of first projections 30 and the plurality of second projections 31 jut out more than the front rail 22 and the rear rails 23. The height of each of the plurality of second projections 31 is smaller than the height of each of the plurality of first projections 30.

In the above embodiment, two projections 30 are formed on the front end of the front-side step 25, and one projection 30 is formed in the center of the portion 27 of the rear-side step 26 extending parallel to the front rail 22 (or in an extension of the portion 27). If the number of first projections 30 is three or more than three, they can define one plane. Therefore, the magnetic head slider 14 can be stably stationed on the disk 13. The pair of second projections 31 is located behind a pivot of a suspension at the corresponding positions in the longitudinal direction of the magnetic head slider 14. The plurality of first projections 30 is disproportionately arranged in the front part of the magnetic head slider 14. However, since the suspension that supports the magnetic head slider 14 holds the part of the magnetic head slider 14 including the plurality of first projections 30, the magnetic head slider 14 would not normally tilt backward on the disk 13 with the plurality of first projections 30 stationed on the disk 13.

When the magnetic head slider 14 starts to operate, the disk 13 temporarily rotates in the direction opposite to the direction of arrow A. At this time, friction occurs between the plurality of first projections 30 and the disk 13. This causes the magnetic head slider 14 to tilt backward. The rear part of the magnetic head slider 14 almost comes into contact with the disk 13. At this time, the plurality of second projections 31 comes into contact with the disk 13 so as to prevent the rear part of the magnetic head slider 14 from coming into direct contact with the disk 13.

Figure 4:
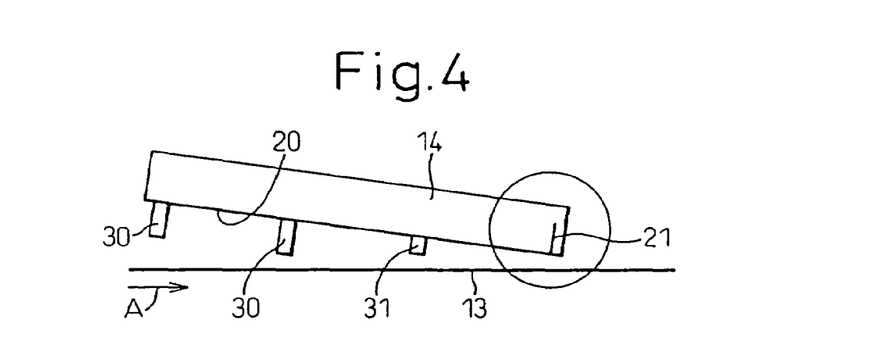
FIG. 4 is a schematic side view showing the magnetic head slider shown in FIG. 2 and put to use.
Figure 5:
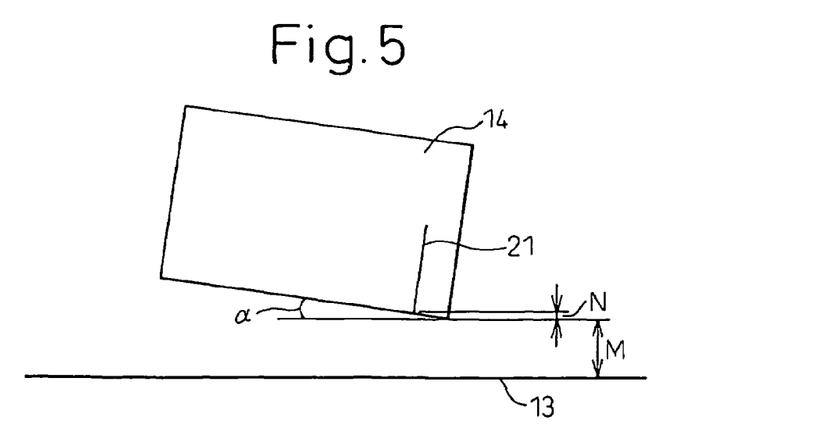
FIG. 5 is an enlarged side view showing a part of the magnetic head slider shown encircled in FIG. 4.

FIG. 4 is a schematic side view showing the magnetic head slider 14 shown in FIG. 2 and put to use. FIG. 5 is an enlarged side view showing a part of the magnetic head slider 14 shown encircled in FIG. 4. During the use of the magnetic head slider 14, the magnetic head slider 14 floats above the disk 13. The magnetic head slider 14 tilts in such a manner that the front part of the magnetic head slider 14 floats above the disk 13 more greatly than the rear part thereof. Namely, the magnetic head slider 14 floats above the disk at an angle of pitch α. The pair of rear rails 23 generates relatively small buoyancy and prevents the magnetic head slider 14 from rolling.

In this case, as the distance of the rear part of the floating surface 20 from the disk 13 is the shortest among all the parts of the floating surface, the magnetic head slider is controlled so that the distance of the rear part of the floating surface 20 from the disk 13 can be retained at a predetermined value (typically called a minimum value M). The electromagnetic transducer element 21 is located immediately ahead of the rear end of the floating surface 20. When the magnetic head slider 14 tilts, the distance of the position on the floating surface 20, in which the electromagnetic transducer element 21 is located, from the disk, becomes a little larger than the minimum value M. Preferably, the difference N between the distance of the position on the floating surface 20, in which the electromagnetic transducer element 21 is located, from the disk 13, and the minimum value M is decreased in order to allow the electromagnetic transducer element 21 to approach the disk 13. By decreasing the inclination (angle of pitch α) of the magnetic head slider 14, the difference N between the distance of the position on the floating surface 20, in which the electromagnetic transducer element 21 is located, from the disk 13, and the minimum value M is diminished. According to the present invention, as the height of each of the plurality of second projections 31 is smaller than the height of each of the plurality of first projections 30, the plurality of second projections 31 would not excessively approach the disk 13 during normal operation. Consequently, the angle of pitch α of the magnetic head slider 14 is decreased, and the difference N is diminished. Eventually, the distance of the electromagnetic transducer element 21 from the disk 13 can be reduced.

Figure 6:
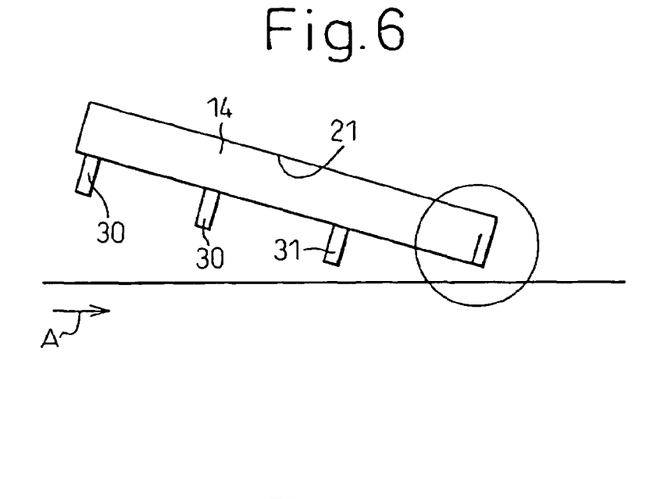
FIG. 6 is a schematic side view showing a magnetic head slider of a comparative example put to use.
Figure 7:
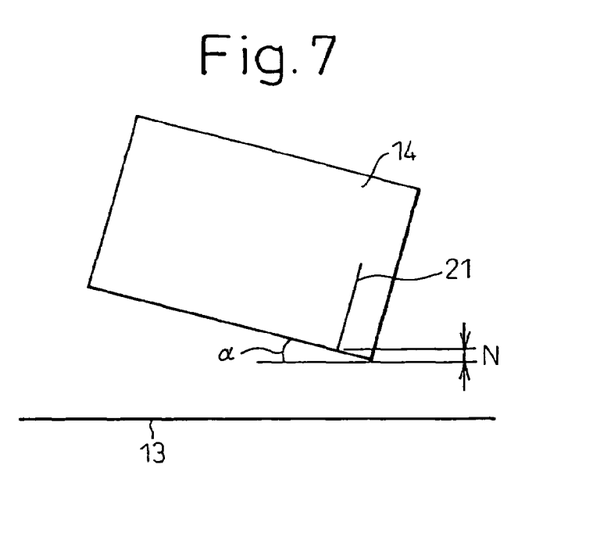
FIG. 7 is an enlarged side view showing a part of the magnetic head slider shown encircled in FIG. 6.

FIG. 6 is a schematic side view showing a magnetic head slider of a comparative example that is in use. FIG. 7 is an enlarged side view showing a part of the magnetic head slider shown encircled in FIG. 6. Referring to FIG. 6 and FIG. 7, the plurality of second projections 31 and the plurality of first projections 30 are all flush with each other. Therefore, when the magnetic head slider 14 tilts relative to the disk 13, the plurality of second projections 31 approaches the disk 13. In order to retain the distance of the rear end of the floating surface 20 from the disk at the minimum value M, the angle of pitch α must be increased. Consequently, the difference N between the position on the floating surface 20, at which the electromagnetic transducer element 21 is located, and the rear end of the floating surface 20 becomes larger.

Figure 8:
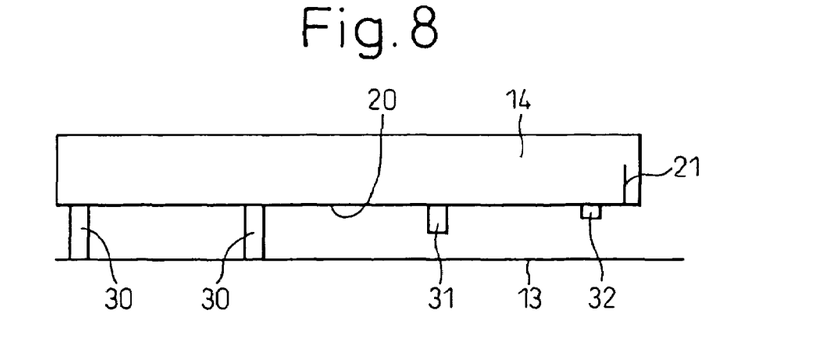
FIG. 8 is a schematic side view showing a magnetic head slider in accordance with another embodiment of the present invention located on a disk.
Figure 9:
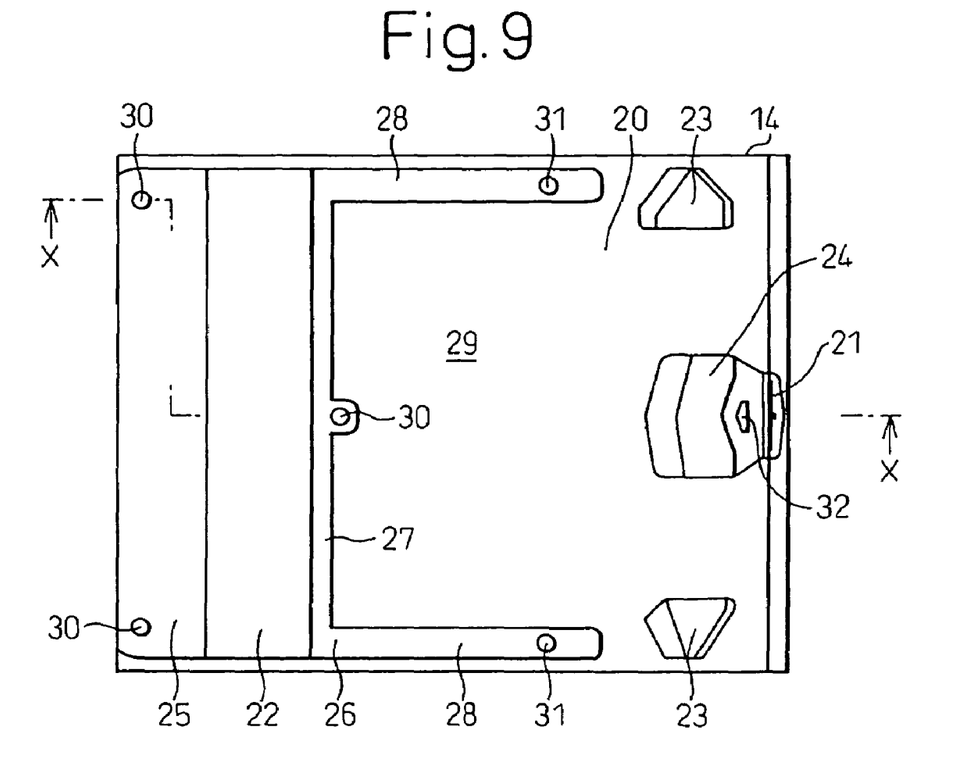
FIG. 9 is a plan view showing the magnetic head slider shown in FIG. 8.
Figure 10:
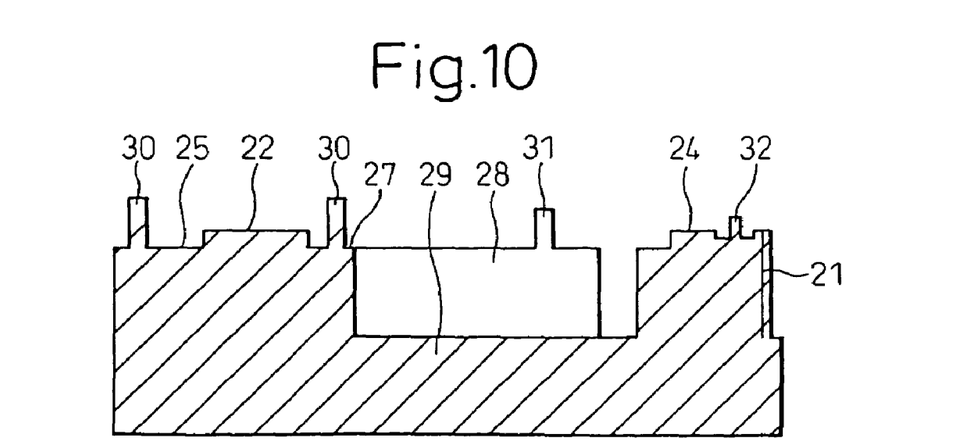
FIG. 10 is a sectional view of the magnetic head slider along a cutting-plane line X-X shown in FIG. 9.

FIG. 8 is a schematic side view showing a magnetic head slider in accordance with another embodiment of the present invention located on a disk. FIG. 9 is a plan view of the magnetic head slider shown in FIG. 8. FIG. 10 is a sectional view of the magnetic head slider along a cutting-plane line X-X shown in FIG. 9. This embodiment is substantially identical to the aforesaid embodiment shown in FIG. 2 to FIG. 5. In this embodiment, similarly to the aforesaid embodiment, the plurality of first projections 30 and the plurality of second projections 31 are included. Furthermore, in this embodiment, a third projection 32 is formed near the electromagnetic transducer element 21. In this embodiment, the third projection 32 is formed on the center rail 24. The height of the third projection 32 is smaller than the height of each of the plurality of first projections 30 and the height of each of the plurality of second projections 31.

FIG. 10 shows the height of each of the front rail 22, center rail 24, steps 25 and 26, area 29, first projections 30, second projections 31, and third projection 32, on the floating surface 20. The functions of the plurality of first projections 30 and of the plurality of second projections 31 are identical to those in the aforesaid embodiment. The third projection 32 reliably prevents the rear end of the floating surface 20 from coming into contact with the disk 13 during the use of the magnetic head slider, keeps a predetermined space intact between the rear end of the floating surface 20 and the disk 13, and prevents a lubricant contained in the disk 13 from sticking to the rear end of the floating surface 20 and the electromagnetic transducer element 21.

Figure 11:
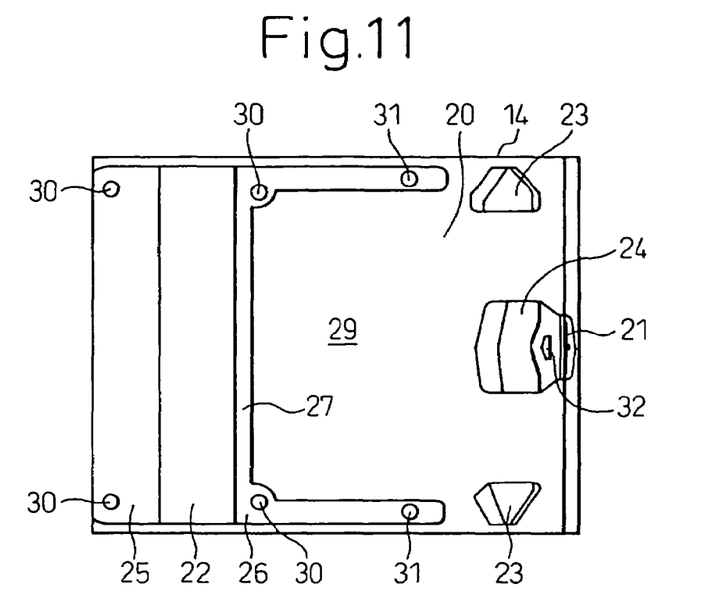
FIG. 11 is a plan view showing a magnetic head slider in accordance with still another embodiment of the present invention.

FIG. 11 is a plan view showing a magnetic head slider in accordance with still another embodiment of the present invention. This embodiment is identical to the embodiment shown in FIG. 9, except that the plurality of first projections 30 is formed in two projections in front of the front rail 20 and in two projections behind the front rail 20. The number of first projections 30 and the positions thereof are not limited to those in the example illustrated in FIG. 11.

Figure 12:
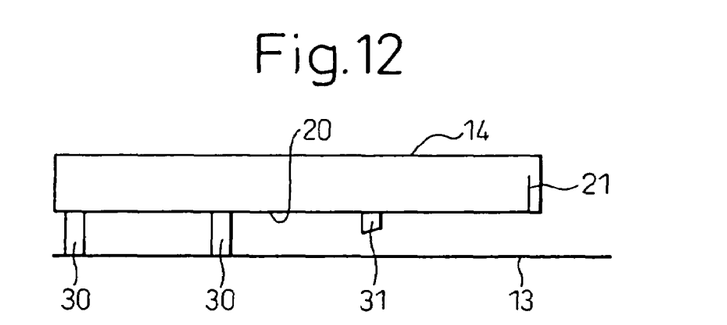
FIG. 12 is a schematic side view showing a magnetic head slider in accordance with still another embodiment of the present invention located on a disk.

FIG. 12 is a schematic side view showing a magnetic head slider in accordance with still another embodiment of the present invention located on a disk. This embodiment is identical to the embodiment shown in FIG. 2, except that the distal parts of the second projections 31 are tapered and the height of each of the distal parts decreases towards the rear end of the magnetic head slider 14. As the distal parts of the second projections 31 are tapered, the angle of pitch α for floating can be reduced.

Figure 13:
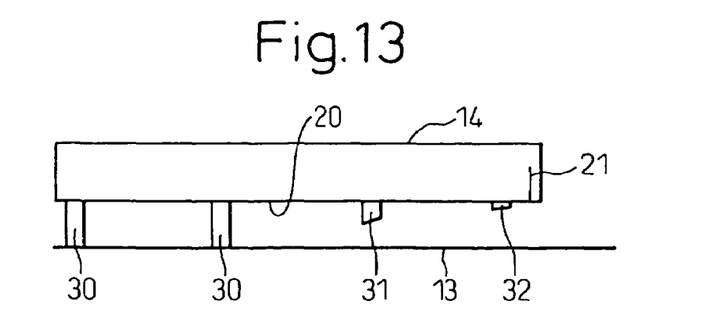
FIG. 13 is a schematic side view showing a magnetic head slider in accordance with still another embodiment of the present invention located on a disk.

FIG. 13 is a schematic side view showing a magnetic head slider in accordance with still another embodiment of the present invention located on a disk. This embodiment is identical to the embodiment shown in FIG. 8, except that both the distal parts of the second projections 31 and the distal parts of the third projections 32 are tapered and both the height of each of the second projections 31 and the height of the third projections 32 decrease towards the rear end of the magnetic head slider 14.

Figure 14:
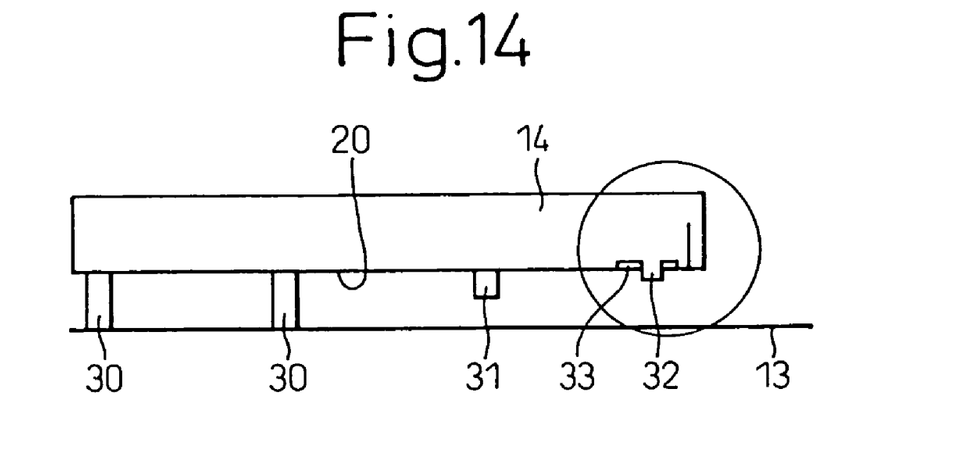
FIG. 14 is a schematic side view showing a magnetic head slider in accordance with still another embodiment of the present invention located on a disk.
Figure 15:
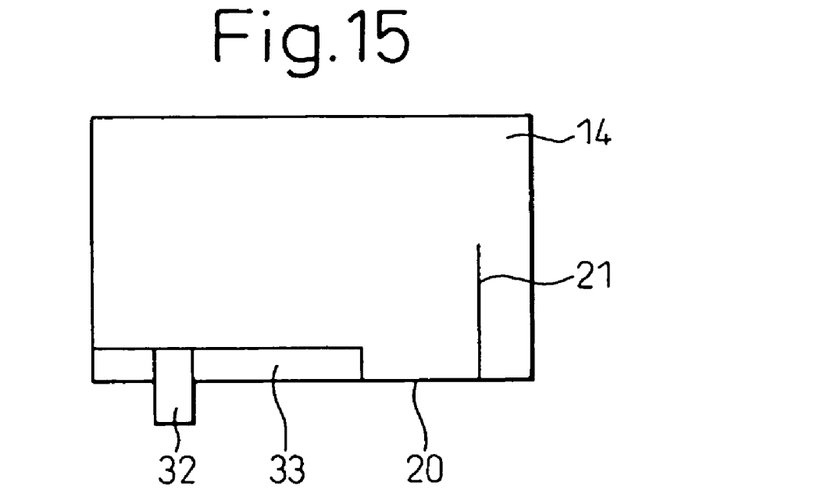
FIG. 15 is an enlarged side view showing a part of the magnetic head slider shown encircled in FIG. 14.
Figure 16A:
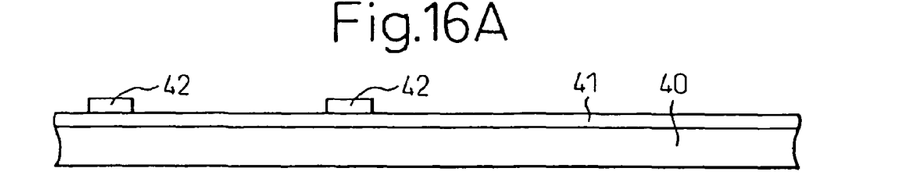
FIG. 16A to FIG. 16F show a process of forming projections on a magnetic head slider.
Figure 16B:
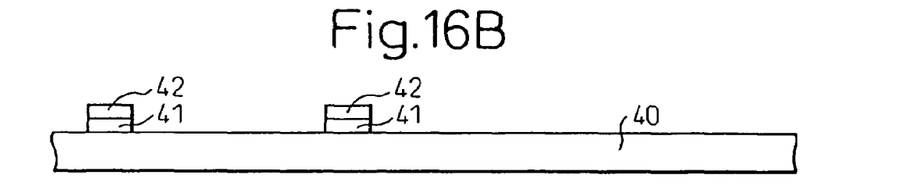
Figure 16C:
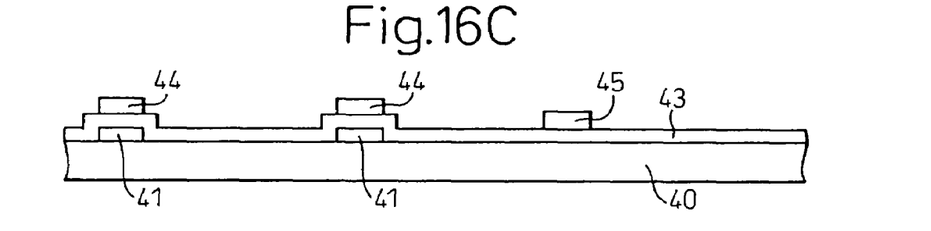
Figure 16D:
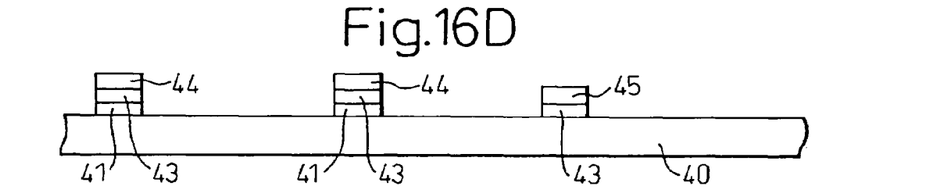
Figure 16E:
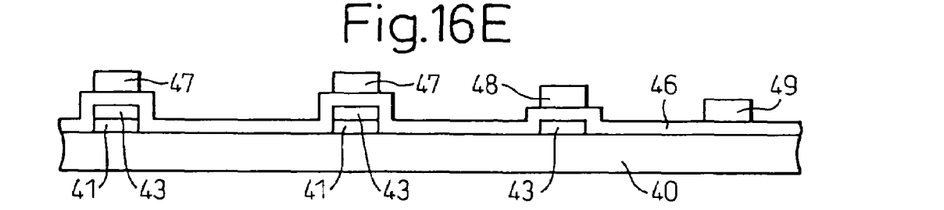
Figure 16F:
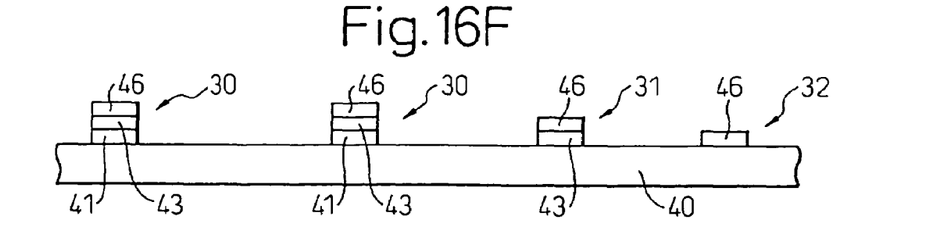

FIG. 14 is a schematic side view showing a magnetic head slider in accordance with still another embodiment of the present invention located on a disk. FIG. 15 is an enlarged side view showing a part of the magnetic head slider shown encircled in FIG. 14. This embodiment is identical to the embodiment shown in FIG. 8, except that a recess 33 intended to prevent the lubricant from sticking to the electromagnetic transducer element is formed near the rear end of the floating surface 20. If the third projection 32 is formed, the recess 33 intended to prevent the lubricant from sticking to the electromagnetic transducer element is formed near the third projection 32. Even when the third projection 32 is not included, the recess 33 intended to prevent the lubricant from sticking to the electromagnetic transducer element may be formed near the rear end of the floating surface 20. As the recess 33 is formed near the rear end of the floating surface 20 or near the electromagnetic transducer element 21, the lubricant applied to the disk 13 would not stick to the electromagnetic transducer element 21.

FIGS. 16A to FIG. 16F show a process of forming projections on a magnetic head slider. In a step shown in FIG. 16A, a film 41 is formed on a base member 40 of the magnetic head slider 14. The film 41 is, for example, composed of a silicon (Si) close contact layer and a diamond-like carbon (DLC) layer. A resist mask 42 is formed at positions in which the plurality of first projections 30 should be formed. In a step shown in FIG. 16B, reactive ion etching (RIE) is performed in order to remove any portions of the film 41 other than the portions of the film 41 located below the resist masks 42. In a step shown in FIG. 16C, after the resist masks 42 are removed, a film 43 is formed, and resist masks 44 and 45 are formed at positions in which the plurality of first projections 30 and the plurality of second projections 31 should be formed. In a step shown in FIG. 16D, reactive ion etching (RIE) is performed in order to remove any portions of the film 43 other than the portions of the film 42 located below the resist masks 44 and 45. In a step shown in FIG. 16E, after the resist masks 44 and 45 are removed, a film 46 is formed, and resist masks 47, 48, and 49 are formed at positions in which the plurality of first projections 30, the plurality of second projections 31, and the third projection 32 should be formed. In a step shown in FIG. 16F, reactive ion etching (RIE) is performed in order to remove any portions of the film 46 other than the portions of the film 46 located below the resist masks 47, 48, and 49. Thereafter, when the resist masks 47, 48, and 49 are removed, the plurality of first projections 30, the plurality of second projections 31, and the third projection 32 are completed.

Furthermore, a resist mask is formed on the base member 40, and ion milling is performed in order to successively form the front rail 22 and rear rails 23, the steps 25 and 26, and the area 29.

In the magnetic head slider 14 fabricated according to the foregoing method, the difference between the height of each of the plurality of first projections 30 and the height of each of the plurality of second projections 31 is equal to the height of the third projection 32. For example, the height of each of the plurality of first projections 30 relative to the front rail 22 and rear rails 23 is 40 nm, the height of each of the plurality of second projections 31 relative to them is 30 nm, and the height of the third projection 32 relative to them is 10 nm. The height of each of the plurality of first projections 30 relative to the front rail 22 and rear rails 23 may range from 40 nm to 50 nm, the height of each of the plurality of second projections 31 relative to them may range from 20 nm to 30 nm, and the height of the third projection 32 relative to them may range from several nanometers to 10 nm.

Moreover, when the third projection 32 is not formed but the recess 33 intended to prevent the lubricant from sticking to the electromagnetic transducer element is formed near the rear end of the floating surface 20, the depth of the recess 33 is made equal to the height of the third projection 32. In this case, the difference between the height of each of the plurality of first projections 30 and the height of each of the plurality of second projections 31 is the same as the depth of the recess 33 intended to prevent the lubricant from sticking to the electromagnetic transducer element.

Moreover, when the third projection 32 is formed and the recess 33 intended to prevent the lubricant from sticking to the electromagnetic transducer element is formed near the third projection 32, the sum of the depth of the recess 33 intended to prevent the lubricant from sticking to the electromagnetic transducer element and the height of the third projection 32 is preferably identical to the aforesaid value of the height of the third projection 32. In this case, the difference between the height of each of the plurality of first projections 30 and the height of each of the plurality of second projections 31 is the same as the sum of the depth of the recess 33 intended to prevent the lubricant from sticking to the electromagnetic transducer element and the height of the third projection 32.

Figure 17:
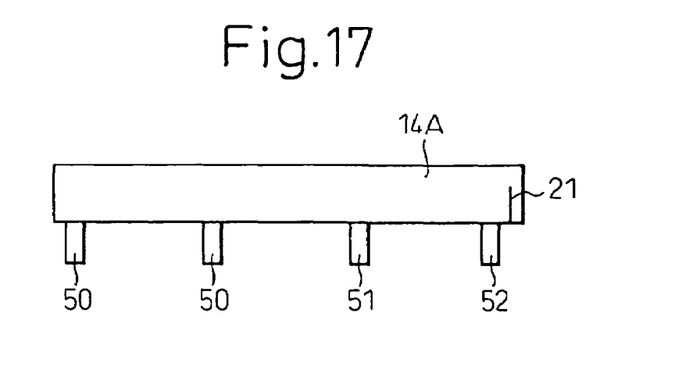
FIG. 17 is a schematic side view showing a magnetic head slider to explain a case in which a magnetic head slider having a plurality of projections of different height is fabricated by using a magnetic head slider that has a plurality of projections of the same height.

FIG. 17 is a schematic side view showing a magnetic head slider to explain a case in which a magnetic head slider having a plurality of projections of different height is fabricated by using a magnetic head slider that has a plurality of projections of the same height.

Referring to FIG. 17, a magnetic head slider 14A is prepared. The magnetic head slider 14A includes a plurality of first projections 50, a plurality of second projections 51, and a third projection 52. The third projection 52 may be excluded. The plurality of first projections 50, the plurality of second projections 51, and the third projection 52 are disposed to have the same positional relationship as the plurality of first projections 30, the plurality of second projections 31, and the third projection 32 shown in FIG. 2 to FIG. 16. However, the height of each of the plurality of first projections 50, the height of each of the plurality of second projections 51, and the height of the third projection 53 are equal to each other.

Figure 18:
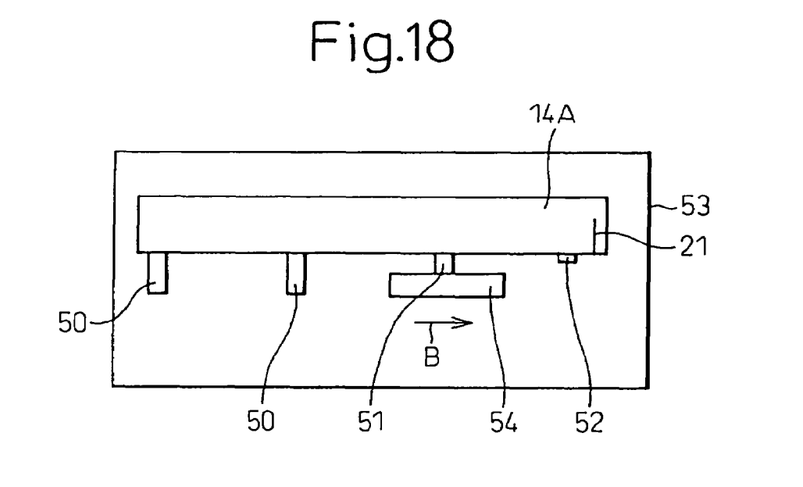
FIG. 18 is a schematic side view showing an example of adjusting the projections of the magnetic head slider shown in FIG. 17.

FIG. 18 is a schematic side view showing an example of adjusting the projections on the magnetic head slider shown in FIG. 17. The magnetic head slider 14A is inserted into a chamber 53, and the plurality of second projections 51 and the third projection 52 are ground by a grinding member 54. The grinding member 54 is continuously moved or rotated as indicated with arrow B. Thus, each of the plurality of second projections 51 is machined so that the height thereof becomes smaller than the height of each of the plurality of first projections 50. The third projection 52 is machined so that the height thereof becomes smaller than the height of each of the plurality of second projections 51. Thus, the aforesaid magnetic head slider 14 is completed.

Figure 19:
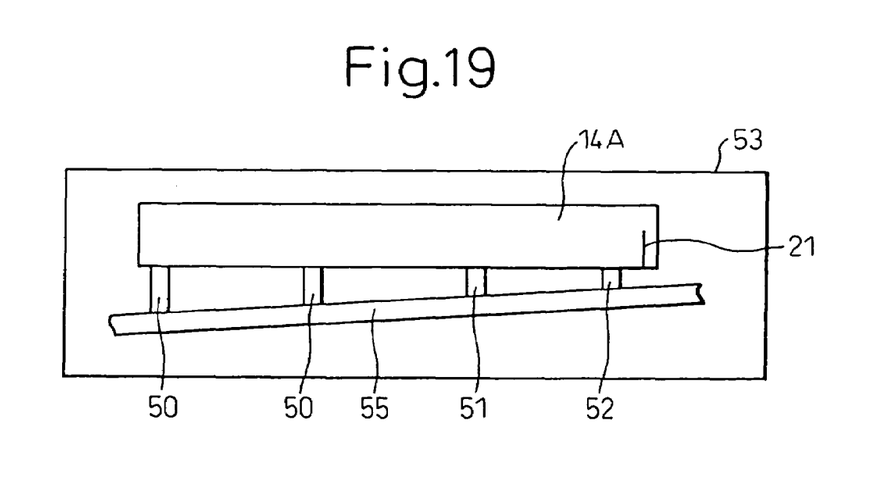
FIG. 19 is a schematic side view showing another example of adjusting the projections of the magnetic head slider shown in FIG. 17.

FIG. 19 is a schematic side view showing an example of adjusting the projections on the magnetic head slider shown in FIG. 17. The magnetic head slider 14A is inserted into the chamber 53, and the plurality of second projections 51 and the third projection 53 are ground by a grinding member 55. The grinding member 55 can rotate like a disk included in a magnetic disk drive. Consequently, each of the plurality of second projections 51 is machined so that the height thereof becomes smaller than the height of each of the plurality of first projections 50. Moreover, the third projection 52 is machined so that the height thereof becomes smaller than the height of each of the plurality of second projections 51. Thus, the aforesaid magnetic head slider 14 is completed.

For example, the chamber 53 is held in a depressurized environment, and the grinding member 54 or 55 is continuously slid against the projections 50, 51, and 52. Thus, the projections are machined so that the height of each of the plurality of second projections becomes smaller than the height of each of the plurality of first projections. As the amount in which the magnetic head slider floats is relatively small in the depressurized environment, the projections are ground while being in contact with the grinding member 54 or 55.

The magnetic head slider 14A may be incorporated in a magnetic disk drive, and the projections of the magnetic head slider 14A may be continuously slid against a disk in a depressurized environment and thus machined so that the height of each of the plurality of second projections becomes smaller than the height of each of the plurality of first projections. Even in this case, as the amount in which the magnetic head slider floats is relatively small in the depressurized environment, the projections are ground while being in contact with the grinding member 54 or 55 serving as the disk.

Moreover, the grinding member 54 or 55 may be driven at a rotating speed lower than a rotating speed adopted in a magnetic disk drive so that the grinding member 54 or 55 can be continuously slid against the projections. Thus, the projections are machined so that the height of each of the plurality of second projections becomes smaller than the height of each of the plurality of first projections. As the amount in which the magnetic head slider floats is relatively small at the low rotating speed, the projections are ground while being in contact with the grinding member 54 or 55.

Moreover, the magnetic head slider 14A may be incorporated in a magnetic disk drive, and a disk may be continuously slid against the projections at a rotating speed lower than a steady-state rotating speed. Thus, the projections may be machined so that the height of each of the plurality of second projections becomes smaller than the height of each of the plurality of first projections. As the amount in which the magnetic head slider floats is relatively small at the low rotating speed, the projections are ground while being in contact with the grinding member (disk) 54 or 55.

As mentioned above, according to the present invention, as the difference between the amount in which an electromagnetic transducer element floats and the minimum value in which a magnetic head slider floats can be smaller than that in the prior art, the electromagnetic transducer element needs to float only a little. This contributes to a high recording density on the magnetic disk.

The invention claimed is:

1. A magnetic head slider comprising:
    a floating surface that is arranged opposed to a disk during the use of the magnetic head slider and that has a front part and a rear part with respect to the direction of rotation of the disk;
    an electromagnetic transducer element;
    a front rail laid on the floating surface near the front part;
    a pair of rear rails laid on the floating surface near the rear part of the magnetic head slider, separate and spaced from the front rail;
    a plurality of first projections disposed on a front side and a rear side of the front rail; and
    a plurality of second projections disposed behind the plurality of first projections, towards the rear part of the magnetic head slider;
    wherein the height of each of the plurality of second projections is smaller than the height of each of the plurality of first projections.

2. The magnetic head slider according to claim 1, wherein the front rail extends in the transverse direction of the magnetic head slider, and the pair of rear rails is disposed on both edges of the magnetic head slider.

3. The magnetic head slider according to claim 1, wherein steps that are lower than the front rail is formed on the front side and the rear side of the front rail, and the plurality of first projections is formed on the steps.

4. The magnetic head slider according to claim 3, wherein the step located on the rear side of the front rail includes portions that extend apart from each other, perpendicularly to the front rail with a predetermined space between the portions, and the plurality of second projections is formed on the portions of the step extending perpendicularly to the front rail.

5. The magnetic head slider according to claim 3, wherein the step located on the rear side of the front rail includes a portion extending parallel to the front rail and portions that are connected to the portion extending parallel to the front rail and that extend apart from each other, perpendicularly to the front rail with a predetermined space between the portions, and the plurality of second projections is formed on the portions of the step extending perpendicularly to the front rail, and at least one of the plurality of first projections is formed on the portion of the step extending parallel to the front rail.

6. The magnetic head slider according to claim 1, wherein a third projection, whose height is smaller than the height of each of the plurality of first projections and the height of each of the plurality of second projections, is formed near the electromagnetic transducer element.

7. The magnetic head slider according to claim 6, wherein the difference between the height of each of the plurality of first projections and the height of each of the plurality of second projections is equal to the height of the third projection.

8. The magnetic head slider according to claim 1, wherein a recess intended to prevent a lubricant, applied to the disk, from sticking to the electromagnetic transducer element is formed near the rear end of the floating surface.

9. The magnetic head slider according to claim 8, wherein the difference between the height of each of the plurality of first projections and the height of each of the plurality of second projections is equal to the depth of the recess intended to prevent the lubricant from sticking to the electromagnetic transducer element.

10. The magnetic head slider according to claim 6, wherein a recess intended to prevent the lubricant from sticking to the electromagnetic transducer element is formed near the third projection.

11. The magnetic head slider according to claim 10, wherein the difference between the height of each of the plurality of first projections and the height of each of the plurality of second projections is the same as the sum of the depth of the recess intended to prevent the lubricant from sticking to the electromagnetic transducer element and the height of the third projection.

12. The magnetic head slider according to claim 1, wherein the height of each of the plurality of second projections decreases towards the rear end of the magnetic head slider.

13. The magnetic head slider according to claim 3, wherein both the height of each of the plurality of second projections and the height of the third projection decrease towards the rear end of the magnetic head slider.

14. A method of fabricating a magnetic head slider which includes a floating surface that is arranged opposed to a disk during the use of the magnetic head slider and that has a front part and a rear part with respect to the direction of rotation of the disk; an electromagnetic transducer element; a front rail laid on the floating surface, rear rails laid on the floating surface separate and spaced from the front rail; a plurality of first projections disposed on a front side and a rear side of the front rail; and a plurality of second projections disposed behind the plurality of first projections towards the rear part of the magnetic head slider, and in which the height of each of the plurality of second projections is smaller than the height of each of the plurality of first projections, the method comprising the steps of:

preparing a magnetic head slider in which the height of each of the plurality of first projections is equal to the height of each of the plurality of second projections; and grinding or machining the plurality of second projections so that the height of each of the plurality of second projections becomes smaller than the height of each of the plurality of first projections.

* * * * *